United States Patent
Cheng (10) Patent No.: US 8,831,981 B2
(45) Date of Patent: Sep. 9, 2014

(54) ELECTRONIC TRANSACTION RECORD DISTRIBUTION SYSTEM

(75) Inventor: Fang Cheng, Mountain View, CA (US)

(73) Assignee: Proximiant, Inc., Mountain View, CA (US)

(*) Notice: Subject to any disclaimer, the term of this patent is extended or adjusted under 35 U.S.C. 154(b) by 190 days.

(21) Appl. No.: 13/540,926

(22) Filed: Jul. 3, 2012

(65) Prior Publication Data

US 2012/0271725 A1    Oct. 25, 2012

Related U.S. Application Data

(63) Continuation-in-part of application No. 13/022,867, filed on Feb. 8, 2011.

(60) Provisional application No. 61/433,820, filed on Jan. 18, 2011.

(51) Int. Cl.
*G06G 1/12* (2006.01)
*G06Q 20/00* (2012.01)

(52) U.S. Cl.
USPC ............................................. 705/21; 705/16

(58) Field of Classification Search
None
See application file for complete search history.

(56) References Cited

U.S. PATENT DOCUMENTS

| | | | | |
|---|---|---|---|---|
| 7,970,669 | B1* | 6/2011 | Santos | 705/30 |
| 2003/0110128 | A1* | 6/2003 | Foth et al. | 705/40 |
| 2004/0236672 | A1* | 11/2004 | Jung et al. | 705/38 |
| 2005/0049928 | A1* | 3/2005 | Naick et al. | 705/26 |
| 2006/0273163 | A1 | 12/2006 | Gusler et al. | |
| 2007/0094088 | A1* | 4/2007 | Mastie et al. | 705/24 |
| 2007/0108269 | A1* | 5/2007 | Benco et al. | 235/380 |
| 2007/0143230 | A1* | 6/2007 | Narainsamy et al. | 705/75 |
| 2007/0203792 | A1* | 8/2007 | Rao | 705/14 |
| 2009/0098825 | A1* | 4/2009 | Huomo et al. | 455/41.1 |
| 2010/0121724 | A1* | 5/2010 | Hawkins et al. | 705/16 |
| 2010/0223145 | A1* | 9/2010 | Dragt | 705/17 |
| 2011/0016007 | A1 | 1/2011 | Shiftan et al. | |
| 2011/0087606 | A1* | 4/2011 | Hammond et al. | 705/304 |
| 2011/0125598 | A1* | 5/2011 | Shin et al. | 705/17 |
| 2011/0307318 | A1* | 12/2011 | LaPorte et al. | 705/14.33 |
| 2013/0132205 | A1* | 5/2013 | Harris | 705/14.65 |

FOREIGN PATENT DOCUMENTS

| | | | |
|---|---|---|---|
| KR | 1020110027009 A | 3/2011 | |
| KR | 1020110123201 A | 11/2011 | |
| KR | 1020120049789 A | 5/2012 | |

* cited by examiner

*Primary Examiner* — F. Zeender
*Assistant Examiner* — Christopher Buchanan
(74) *Attorney, Agent, or Firm* — Donald R. Boys; Central Coast Patent Agency, Inc.

(57) ABSTRACT

A point-of-sale (POS) receipt management system has a computerized appliance at the POS executing first software (SW) from a non-transitory physical medium, and a peripheral device coupled to the computerized appliance, the peripheral device enabled to transmit data wirelessly to a portable communication device in close proximity to the peripheral device, the portable communication device in possession of a consumer. Upon the consumer completing a transaction at the POS, the POS computerized appliance prepares transaction data, which is transmitted to the peripheral device, and hence wirelessly to the portable communication device in possession of the consumer.

10 Claims, 6 Drawing Sheets

ELECTRONIC TRANSACTION RECORD DISTRIBUTION SYSTEM

CROSS-REFERENCE TO RELATED DOCUMENTS

The present application incorporates all of the disclosure of prior co-pending U.S. application Ser. No. 13/022,867, filed Feb. 8, 2011, and of U.S. Provisional application 61/433,820, filed Jan. 18, 2011, at least by reference, and also adds new matter. Priority is claimed to the filing date of Ser. No. 13/022,867 for any claims enabled entirely by the disclosure of that application, and to the filing date of Ser. No. 61/433,820 for any claims enabled entirely by that Provisional application.

BACKGROUND OF THE INVENTION

1. Field of the Invention

The present invention is in the field of commerce and pertains particularly to methods and apparatus for acquiring a transaction record from an electronic point of sale (POS) system.

2. Discussion of the State of the Art

In the art of commerce, including ecommerce, receipts are important records of financial transactions. Many receipts are physically printed on paper by point-of-sale (POS) systems, vending machines, ticketing machines or other systems or machines that facilitate completion of financial transactions or goods exchanges. Keeping, organizing, and retrieving paper receipts can be time consuming and tedious. Physical receipts might be lost, temporarily misplaced, or destroyed before they are aggregated for tax filing or other financial auditing purposes.

Many receipts are in electronic format. Such electronic receipts are used in e-commerce, where a financial transaction or goods exchanges is accomplished through Internet or via telephone. An electronic receipt is essentially a file that contains data that is similar to a paper receipt. Electronic receipts are delivered to the receiving parties remotely, or from a remote location. Therefore, the receiver of the record must send contact information to the sender, most commonly an email address. However, sharing an email address or other personal contact information with the receipt sender exposes the receipt-receiving entity to privacy and security risks.

More recently, efforts have been made to utilize electronic receipts for physical retail. There have been software products developed to integrate with POS systems to output the receipt information to a file. The electronic record or receipt is uploaded to a central server, from whence it is sent from the server to a receiving device, or it might be sent directly to the receiving device. A problem with this approach is that the consumer has to provide identification and contact information to the POS or to a third party service provider. In the case of a third party service, the provided contact and identification data may be used solely at the third party service.

A problem is also evident in the art that integration must be accomplished between a POS and a third-party system before records may be distributed to specific third-party systems or devices. Systems of this type often store more information about the receipt sending entity than just the receipt information and integration to such systems may raise security and privacy concerns, which may have an effect of slowing or preventing broad adoption of such electronic record distribution systems.

Therefore, what is clearly needed is a record distribution system for a POS computing system that provides direct receipt distribution locally or to a remote repository controlled by a user.

SUMMARY OF THE INVENTION

The problem stated above is that environmentally friendly and efficient record generation and receipt in a business to consumer (B2C) transaction scenario is desirable for an enterprise and patronizing consumer, but many of the conventional means for acquiring a record of receipt, such as by printing (physical receipt) or remote send (electronic receipt), also create unnecessary paperwork (physical printing) and potential security risks (remote send). The inventors therefore considered functional components of a point of sale (POS) computing system, looking for elements that exhibit integrate ability that could potentially be harnessed to provide receipt presentation and acquisition but in a manner that would not create security challenges or more paperwork.

Every enterprise that markets products and or services is propelled by consumer patronage, one by-product of which is an abundance of transactions that will occur and which must be accounted for. Most such enterprises employ networked POS computing systems to conduct the day-to-day business of the enterprise, and POS computing terminals and similar consumer interfacing applications and machines are typically a part of such apparatus.

The present inventor realized in an inventive moment that if, at the point of transacting, records of the transaction including associated data could be efficiently and securely transmitted from the POS computing appliance to a secure personal device or other secure storage location of a consumer, significant improvements in efficiency and security surrounding the transaction might result. The inventor therefore constructed a unique system for transmitting records that allowed consumers to acquire their receipts directly from the POS computing system using a close-proximity wireless protocol to make the acquisition in an efficient high security setting. A significant improvement in efficiency and reduction in the cost of transacting results, with no impediment to work or quality of service (QoS) created.

Accordingly, in an embodiment of the present invention, a point-of-sale (POS) receipt management system is provided, comprising a computerized appliance at the POS executing first software (SW) from a non-transitory physical medium, and a peripheral device coupled to the computerized appliance, the peripheral device enabled to transmit data wirelessly to a portable communication device in close proximity to the peripheral device, the portable communication device in possession of a consumer. Upon the consumer completing a transaction at the POS, the POS computerized appliance prepares transaction data, which is transmitted to the peripheral device, and hence wirelessly to the portable communication device in possession of the consumer.

In one embodiment of the invention the wireless communication from the peripheral device to the consumer's portable communication device is by near-field communication (NFC) enabled in both the peripheral device and the consumer's portable communication device. In another embodiment the wireless communication from the peripheral device to the consumer's portable communication device is by Bluetooth™ technology enabled in both the peripheral device and the consumer's portable communication device. In yet another embodiment the wireless communication from the peripheral device to the consumer's portable communication device is by a combination of NFC technology and Bluetooth™ technology enabled in both the peripheral device and the consumer's portable communication device. Instill another embodiment the wireless communication from the peripheral device to the consumer's portable communication device is by encoding the transaction data as an image-based code which is displayed on a display of the peripheral device and captured by a camera of the consumer's mobile communication device, and subsequently decoded. The image-based code may be a QR code. IN still another embodiment of the invention the wireless communication from the peripheral device to the consumer's portable communication device is by ultrasound technology enabled in both the peripheral device and the consumer's portable communication device.

In one embodiment the POS appliance is Internet-connected, the transaction information is transmitted to a third-party server in the Internet and a transaction ID is transmitted via the peripheral device to the consumer's portable communication device, enabling the consumer to download the transaction information from the third party server. In some cases the transaction data may be pushed by the third-party server to an internet-connected appliance selected by the consumer.

In another aspect of the invention a point-of-sale (POS) receipt management method is provided, comprising the steps of (a) composing transaction information at a point-of-sale computerized appliance regarding a completed transaction with a consumer; (b) transmitting the transaction information to a peripheral device coupled to the computerized appliance; and (c) transmitting the transaction information by the peripheral device to a portable communication device associated with the consumer, using close-proximity wireless technology.

In one embodiment of the method in step (c) the wireless communication from the peripheral device to the consumer's portable communication device is by near-field communication (NFC) enabled in both the peripheral device and the consumer's portable communication device. I another embodiment in step (c) the wireless communication from the peripheral device to the consumer's portable communication device is by Bluetooth™ technology enabled in both the peripheral device and the consumer's portable communication device. In yet another embodiment in step (c) the wireless communication from the peripheral device to the consumer's portable communication device is by a combination of NFC technology and Bluetooth™ technology enabled in both the peripheral device and the consumer's portable communication device.

In one embodiment of the method of the invention in step (c) the wireless communication from the peripheral device to the consumer's portable communication device is by encoding the transaction data as an image-based code which is displayed on a display of the peripheral device and captured by a camera of the consumer's mobile communication device, and subsequently decoded. The image-based code may be a QR code. In yet another embodiment the wireless communication from the peripheral device to the consumer's portable communication device is by ultrasound technology enabled in both the peripheral device and the consumer's portable communication device.

In another embodiment of the method the POS appliance is Internet-connected, the transaction information is transmitted to a third-party server in the Internet and a transaction ID is transmitted via the peripheral device to the consumer's portable communication device, enabling the consumer to download the transaction information from the third party server. IN some cases the transaction data is pushed by the third-party server to an internet-connected appliance selected by the consumer.

DETAILED DESCRIPTION

The inventor provides a data transmission system used at physical point-of-sale (POS) systems that enables a consumer to receive a record of a transaction or other business conducted without requiring the consumer to provide personal contact information to the POS entity. The present invention is described in enabling detail using the following examples, which may describe more than one relevant embodiment falling within the scope of the present invention.

Figure 1:
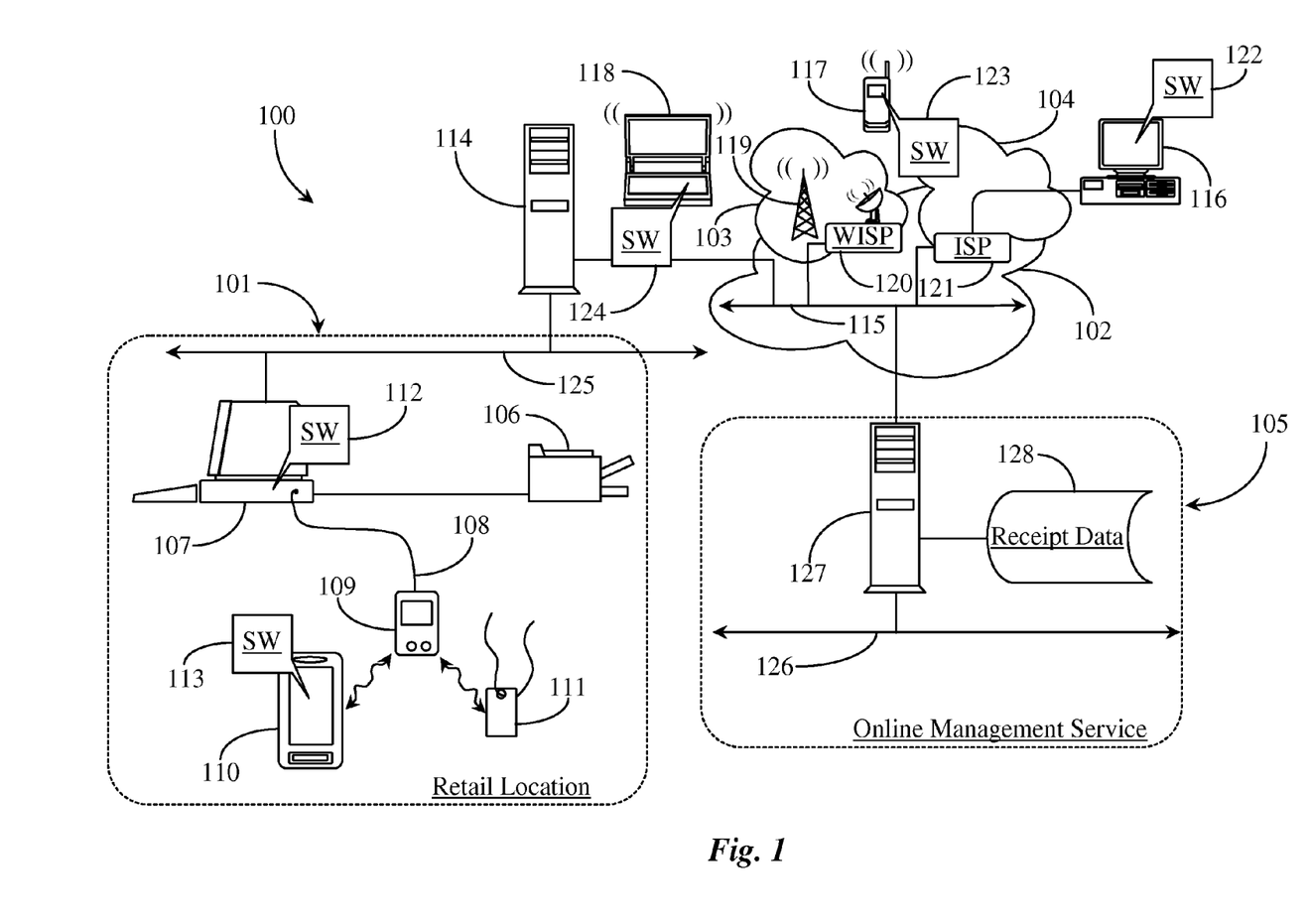
FIG. 1 is an architectural overview of a transaction network supporting direct transfer of a transaction record according to an embodiment of the present invention.

FIG. 1 is an architectural overview 100 of a transaction network supporting direct transfer of a transaction record according to an embodiment of the present invention. Transaction network 100 includes a retail sales location 101. Location 101 represents any physical location where a consumer may obtain a record of a transaction including store locations, ticket machines, ATM location, or any other location where a physical receipt might be printed for a consumer. Retail location 101 includes a local area network (LAN) 125. LAN 125 may be connected to an automatic transaction network (ATM) or to an Internet network without departing from the spirit and scope of the present invention.

LAN 125 supports a point-of-sale (POS) computing appliance 107. POS appliance 107 is a sales terminal in this example. In one aspect, LAN 125 supports the terminal that is connected to a server that has POS SW installed and executable there from. POS appliance 107 in this embodiment includes a keyboard for input and a monitor for display. Other methods of input may also be provided such as touch screen input. Appliance 107 has a peripheral device 109 connected thereto, in this example, by a computer peripheral cable 108. In one embodiment, device 109 is a dongle device equipped with a wireless communications capability such as near field communications (NFC), Bluetooth™ or both capabilities. Dongle device 109 is cabled to computing appliance 107 in this example. In one embodiment, the dongle device is a universal serial bus (USB) dongle connected via a USB cable. In another embodiment the dongle may be connected to appliance 107 via a serial or parallel port cable. In another embodiment, dongle device 109 utilizes a wireless connection to commuting appliance 107 such as infrared, wireless USB, or some other wireless connection protocol.

Computing appliance 107 in this example has a printer 106 connected to it via a standard printing cable. More than one physical printer may be connected to computing appliance 107 without departing from the spirit and scope of the present invention. In one embodiment printer 106 has wireless connection capability and is wirelessly configured to POS computing appliance 107. Printer 106 is a default printer or the printer used to print transaction records or receipts for consumers who purchased a product or service from the location. In other embodiments printers having connection with the POS may be network printers or printers connected to the same network as the POS.

In an embodiment of the present invention, dongle device 109 with the aid of SW 112 emulates printer 106 as a default printing destination. When dongle 109 is properly installed and ported to POS computing appliance 107, the dongle is immediately recognized as a default-printing destination for consumer transaction records, typically characterized as transaction receipts. A consumer operating mobile communications device 110 may make a purchase at location 101. The transaction record is sent to the dongle device 109 where it may or may not be displayed on the device. The receipt is an electronic file that is transmitted directly to mobile communications device 110 by way of NFC protocol. A consumer must bring mobile device 110 within NFC range (10 CM or less) to the dongle to initiate the data transmittal from the dongle directly to the mobile device.

In one embodiment the dongle device is not specifically required to emulate a printer. In one aspect of the invention, the paper printer setup process may be altered or modified, or the system may intervene in the normal printing process. For example, one might modify or intervene in the spooler step provided by the operating system during the printing process. Instead of simply printing to the printer, the spool SW may be adapted to temporarily store the printing data in memory or computing hardware before sending the data to printer driver. Thus, the spooler may send the printing data to multiple destinations including the dongle device, a paper printer, or directly to a transaction terminal. According to another embodiment of the invention, a copy of the printing data is made by SW adapted for the purpose just after the spooler receives the print data but before it is erased from temporary memory controlled by that spooler SW.

In yet another possible embodiment of the present invention, the dongle component connects to the POS computing device and the paper printer. In this case, a computational protocol (not illustrated) running on the operating system (OS) receives the printing data and sends a copy to SW of the dongle. This algorithm also sends a copy to the paper printer. It is noted herein that this alternative embodiment works downstream from the printer driver. However, the first two alternative embodiments are implemented upstream from the printer driver. This fact will make some difference in the format of the printing data that the dongle device receives. A printer driver could be adapted with a unique coding standard when working downstream of a paper printer driver, such that the data received by the dongle has already been encoded according to the paper printer standard. In this respect the last mentioned alternative embodiment, the data received typically has to be decoded according to the paper printer standard. This may add some complexity to implementation making the third embodiment a less desirable embodiment.

Dongle device 109 is illustrated in this example as in communication with a mobile communications device 110. Communications device 110 may be a smart phone, an android device, a personal digital assistant, an iPad device, or any other mobile-platform computing appliance. In this embodiment, mobile phone 110 is used to accept a record of a transaction transmitted wirelessly from dongle device 109. In this embodiment, POS computing appliance has SW 112 (dongle drivers) provided to support the operation and capabilities of dongle device 109. Driver SW (SW 112) installed on POS computer 107 allows the dongle device to be immediately recognized as a receipt printer.

Device 109 can emulate either one type or multiple types of receipt printers in software and can allow the configuring user (POS Host) to choose which particular printer the device should emulate so that the device can appear to be the same type of printer as the actual receipt printer (106) in use at the location. When the dongle is plugged into a POS computing appliance like appliance 107, and the drivers are installed and running, the POS computing appliance immediately recognizes the dongle as a receipt printer and a pop up window may appear of the POS display asking the merchant to choose among a list of printer type options for the type of printer that they would like the dongle to emulate. The merchant chooses the same type of printer as the receipt printer they currently use. SW 112 allows the dongle to acquire receipt information when the POS computer sends a printing request. The receipt information (transaction record) acquired in printer format can be decoded and reformatted to other formats on the dongle device for better readability if required. The dongle can also be configured to convert print formats to standard PDF or HTML formats.

During installation, the driver/installation software (112) recognizes all existing printers that the POS computer is connected to. This presents merchants with an option to create a master printer with a name they may specify. This enables the merchant to print on their existing paper, receipt printer, and the dongle simultaneously. Technically, this is accomplished by implementing a printer filter function in the driver software, which allows the printing commands/messages to be passed through to the actual paper receipt printer.

A transaction record can include a number of data categories such as merchant name, address, and department, date and time of transaction, payment method used, warranty information, rebate information, and so on. Data might be itemized on the dongle device such as the name, price, and quantity of items purchased, total price paid, total tax, tip, and other like information. In one embodiment, the dongle device includes SW for parsing the data to extract certain data that can then be automatically organized, managed and analyzed for accounting, tax filing, or for other purposes. In another embodiment the functions may be performed on the POS system using the first SW.

Mobile communications device 110 has SW 113 provided thereto and adapted to enable wireless receipt of a transaction record held on dongle device 109 via a close proximity wireless protocol such as near field communication (NFC), Bluetooth™, or some other close proximity wireless protocol. In one embodiment, NFC is used to pair mobile telephone 110 and dongle device 109 for Bluetooth™ communication. In this embodiment, a consumer operating mobile telephone 110 brings the device within NFC range (10 centimeters or less) in order to initiate Bluetooth™ pairing and establishment of a subsequent Bluetooth™ session. The consumer may then acquire the transaction record when the Bluetooth™ session becomes active and the receipt is transmitted from the dongle to the mobile device.

LAN 125 supports an Internet access server 114. Internet access server 114 enables the POS computing station to receive Internet access services. Server 114 is connected to a network backbone 115 in Internet network 102. Backbone 155 represents all of the lines, equipment, and access points that make up the Internet network as a whole. Therefore, there are no geographic limitations to practice of the present invention. The invention, it is noted, may be practiced locally without any requirement for logging on to any network. However, in one embodiment, a consumer operating mobile telephone 110 may desire to have the transaction record forwarded to a repository held online by a third-party service such as an online management service 105.

In one embodiment, a consumer may bring an NFC-enabled or a radio-frequency-identification (RFID) tag 111 into communication range with dongle device 109 in the absence of an NFC-enabled communications device like device 110. This action may cause a consumer identification (ID) parameter such as a personal identification number (PIN) or personal access code (PAC) to be transmitted (read) from the NFC or RFID tag. The ID may also include a network destination address like a universal resource locator (URL) to the online repository destination. Management service 105 includes a LAN 126 that supports an Internet connected data server 127. Data server 127 includes a physical digital medium coupled thereto that is adapted to hold all of the SW and data required to enable data server functionality.

Server 127 has connection to Internet backbone 115. POS 107 may, instead of printing a local record, forward the record to server 127 via access line 124 and network backbone 115. Server 127 receives the record and stores the record along with other records for the identified and validated consumer. Consumers may then access receipts when required with the aid of third-party SW. For example, a consumer operating a desktop computer 116 aided by a SW application 122 accesses server 127 through a public-switched-telephone-network (PSTN) 104, an Internet service provider (ISP) 121, and network backbone 115. SW application 122 may be provided by the third-party service as a downloaded and installed application to effect registration, and to regulate access to data stored in repository 128 labeled receipt data.

A consumer operating a wireless cellular phone 117 aided by a SW application 123 may access server 127 through a wireless carrier network (WCN) 103, a cell tower 119, a wireless Internet service provider (WISP) 120, and network backbone 115. A consumer operating a laptop computer 118 aided by SW 124 may access server 127 through WCN 103, cell tower 119, and WISP 120. In another embodiment, a consumer operating mobile telephone 110 aided by SW 113 may retrieve the receipt from dongle 109 temporarily, and then upload it to server 127 for storage in repository 128 at a later time. There are many possibilities. SW 113 may also receive data from server 127. SW applications 122, 123, and 124 represent third-party applications for interacting with a subscriber service for storing records online and are not explicitly required in order to practice the present invention.

After a consumer has transaction records stored on his or mobile device, the consumer may set the mobile SW application to "sync" the cumulated receipt information with his/her personal computer, server, or other electronic devices. When the customer requires a receipt for return, product exchange, or other purposes, he/she only needs to pull up the particular receipt on his/her mobile device, or download it to the mobile device from the server. The digital receipt may be displayed on the mobile device so that the merchant can scan the bar code on the receipt for processing the requested transaction. Alternatively, the user can print out the digital receipt on paper when necessary from their mobile device or by uploading the digital receipt to a server and then accessing it on the web.

When a consumer needs a receipt for return, product exchange, or the like, the consumer can call up the particular receipt on the host mobile device or download it to the mobile device from a third-party service. The digital receipt may be displayed on the display screen of the mobile device so that the POS merchant can scan the bar code on the receipt for processing the requested transaction. Alternatively, the user can print out the digital receipt on paper whenever necessary from their mobile device or by uploading the digital receipt to a server and then accessing it on the web to print it.

Figure 2:
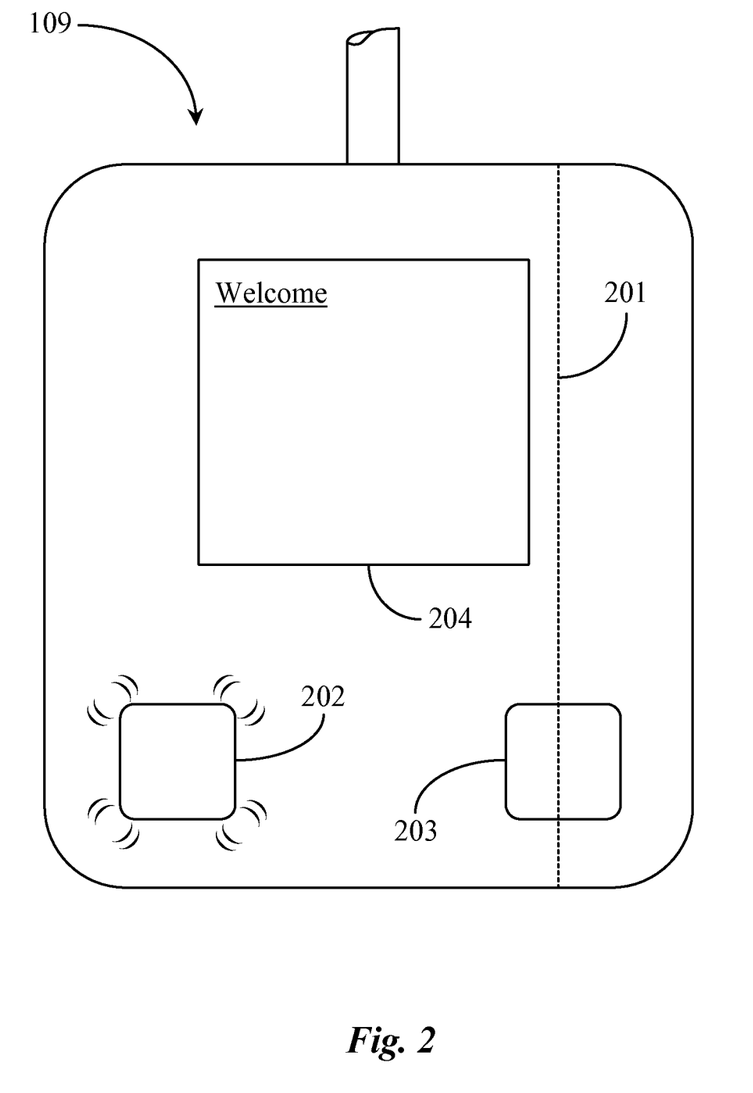
FIG. 2 is a plan view of a dongle device of FIG. 1 according to an embodiment of the present invention.

FIG. 2 is a plan view of dongle device 109 of FIG. 1 according to an embodiment of the present invention. Dongle device 109 may be a wireless device or a tethered device without departing from the spirit and scope of the present invention. In this example, device 109 may be adapted additionally as a physical credit and debit card reader and may include a card reading slot 201 for swiping a debit or credit card during transacting. In this example, dongle 109 has a display 204. Display 204 may be used during transacting to display transaction particulars and for displaying a transaction record such as an electronic receipt.

When the dongle receives a print command, it displays the receipt data in display window 204. Dongle 109 has at least one indicator light or button 202 that can be programmed to illuminate when a transaction record is ready to be offloaded from the device. In one embodiment a button 203 is provided as a submit button for submitting a consumer PIN or PAC transmitted to the dongle from an NFC or RFID tag along with the resident transaction record to a third-party hosted storage and management service. In one embodiment a consumer may upload certain tax-deductible receipts directly to a tax service account so that by the end of the year all of the tax-deductible receipts are accounted for and organized according to tax reporting protocols. In one embodiment, the SW program can algorithmically port the data to an existing tax-related function. Dongle device 109 does not require a display to practice the invention.

In one embodiment a user interacts with the dongle device as a POS terminal including sliding the credit or debit card to initiate payment. The dongle with the aid of SW 122 can transmit data to a mobile telephone like device 110 at different stages of a transaction. In an embodiment where a consumer wants a printed receipt but not a transmitted file, the dongle device can function as a pass through inline device sending the transaction record data (print request) on to the default physical printer connected to the POS computing appliance. Alternately, if the user doesn't want a paper receipt, the dongle device can avoid sending the receipt to the default printer. In one embodiment this functionality can be managed via the dongle device using input controls and a display configured as a consumer interface. In one embodiment, a consumer interface for selecting specific functionality is provided on the POS as part of SW 112 and not directly on the dongle device.

As an alternative, a consumer can use a wireless NFC accessory to gain NFC capability on their Bluetooth™-enabled device. More specifically, such a wireless NFC accessory may consist of both Bluetooth™ and NFC components. Such an accessory would have a processor and circuitry for passing data in-between the two different communication components. One of the functions of the accessory would be to pair Bluetooth™ on the dongle device with Bluetooth™ on the hardware accessory ported to the mobile telephone and getting data from the dongle device through NFC and passing the data within the accessory from its own NFC to its own Bluetooth™. Since the consumer device has already been paired with Bluetooth™, the receipt data can then be transferred from the dongle to the consumer device through a Bluetooth™ connection.

However, this embodiment uses NFC as the method for transmitting receipt data between user accessory and merchant dongle device and uses the Bluetooth™ as method for transmitting data between user accessory (NFC-hardware extension) and user main device (mobile communications device). One embodiment disclosed uses NFC as bridge connection for pairing user device and merchant dongle and uses Bluetooth™ or other connection methods for transmitting receipt data.

It is noted herein that the dongle device and SW functionality does not require integration with a POS computing platform or other receipt generating system because it interfaces through standard printing protocols already recognized by the systems. This fact makes the dongle device very simple and easy to adopt by merchants and businesses regardless of the kind of POS protocols used.

Figure 3:
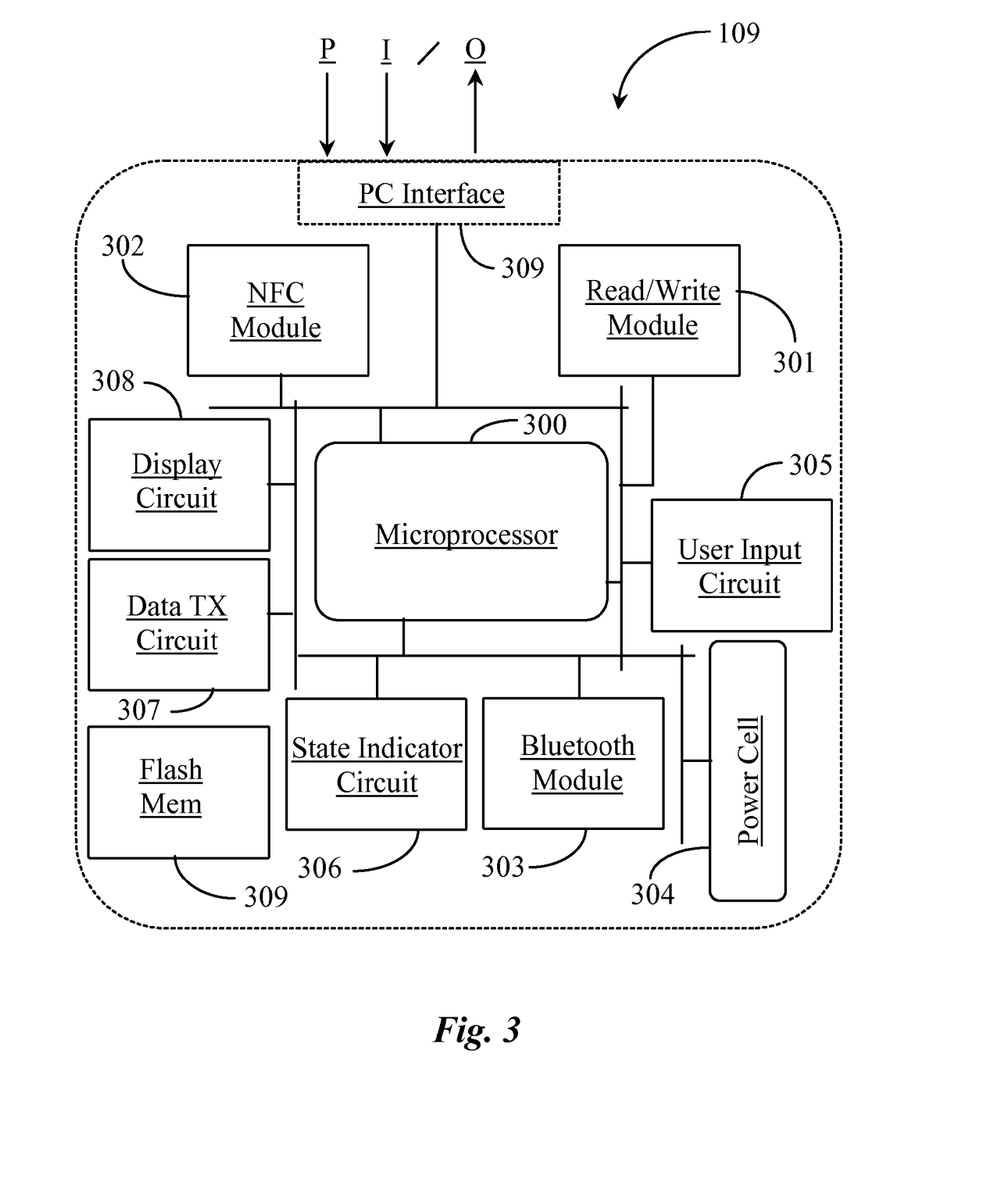
FIG. 3 is a block diagram illustrating basic and optional components of the dongle device of FIG. 1 according to an embodiment of the present invention.

FIG. 3 is a block diagram illustrating basic and optional components of dongle device 109 of FIG. 1 according to an embodiment of the present invention. Dongle device 109 includes a PC interface 309 for porting or plugging the device into a port on a POS computing appliance. In this example, a power line-in, a data input line, and a data output line (I/O) is illustrated. In this example, dongle device includes a microprocessor 300 adapted to process data on the device and to transmit data upon initiation or request. A BUS structure is available on the device to connect the various device components for operation. Dongle device 109 includes an NFC module 302 enabling near field transmittal of data in a bi-directional fashion between the device and a mobile communications appliance like smart phone 110 of FIG. 1. NFC module 302 may also be adapted to communicate with an NFC or RFID tag.

In this example, dongle device includes a read/write module 301 adapted for reading data from a card and for writing data to a card. It is assumed herein that the NFC module enables transmittal of data and receipt of certain forms of data between the dongle and a mobile communications device or a radio-enabled NFC or RFID tag. Dongle device 109 may include a display circuit 308 adapted to enable display of data. Dongle device 109 includes a consumer input circuit 305 adapted to enable a consumer to interact with the dongle as a POS terminal consumer interface. In one embodiment the display is a touch screen display and the consumer may interact with the device using the touch screen. In another embodiment a physical keypad, an array of action buttons, or other input indicia might be provided. A flash memory module 309 is provided for the purposes of storing data for transmit to other devices. A small amount of random access memory (RAM) and read only memory (ROM) may be provided for boot SW load and other purposes. In one embodiment the memory is organized as a fast cache for quick upload or transfer of data.

Dongle device 109 includes a data transmittal circuit (TX) 307. TX circuit 307 is adapted to enable the dongle device to transmit data using NFC or Bluetooth™. In other embodiments other wireless protocols might be adopted. Dongle device 109 includes a state indicator circuit 306. State indicator circuit 306 is adapted to enable a flashing icon, light emitting diode (LED), illuminated button, or the like to illuminate thereby indicating a state like readiness to transmit data. There may be one or more such indicators installed on the dongle device 109 without departing from the spirit and scope of the present invention. An indicator may be a flashing icon on display in the display screen or touch screen. An indicator might be a light emitting diode (LED) or some other light source integrated to the device.

In one embodiment of the present invention, dongle 109 is adapted for Bluetooth™ via a Bluetooth™ module 303. Bluetooth™ module 303 may be used for communication instead of NFC. In one embodiment NFC may be used on the device to pair the device with another Bluetooth™ device for data transmittal from either device to the other device. Dongle device 109 includes a power cell 304. Power cell 304 may be a rechargeable battery. Power cell 304 is not specifically required in order to practice the invention as power may be input from the host computer the device is ported to. It will be apparent to one with skill in the art that the dongle device of the present invention may include fewer or more components than are illustrated here. The complexity of the device and its capabilities may vary depending on design and intent. For example, the device may not include a display or a user input means. In another embodiment the device may include both a display and means of user input. The primary functions of the device in a preferred embodiment are printer emulation, file format validation and conversion if required, and the capability of communicating the print information to another device and to pick up data like instructions, a PIN, or a PAC from another device.

It is noted herein that some POS terminals are not attended computing systems but are automated attendant machines instead that are capable of hosting a transaction and printing a receipt. These types of interfaces include automatic teller machines (ATMs) and gas station attendant machines among others. In such machines the capabilities of dongle device 109 may be provided in SW and may be integrated with the standard public interface window for those types of machines by installing a wireless interface for NFC or Bluetooth™ communication capability. In another embodiment transmission of data may be accomplished through card swiping (read and writing). For example, the user would after completing a transaction might swipe his or her card again to accept an electronic receipt written to the card, which can then be transferred to another device that can read the card such as a peripheral card reader connected to a host computing appliance.

Figure 4:
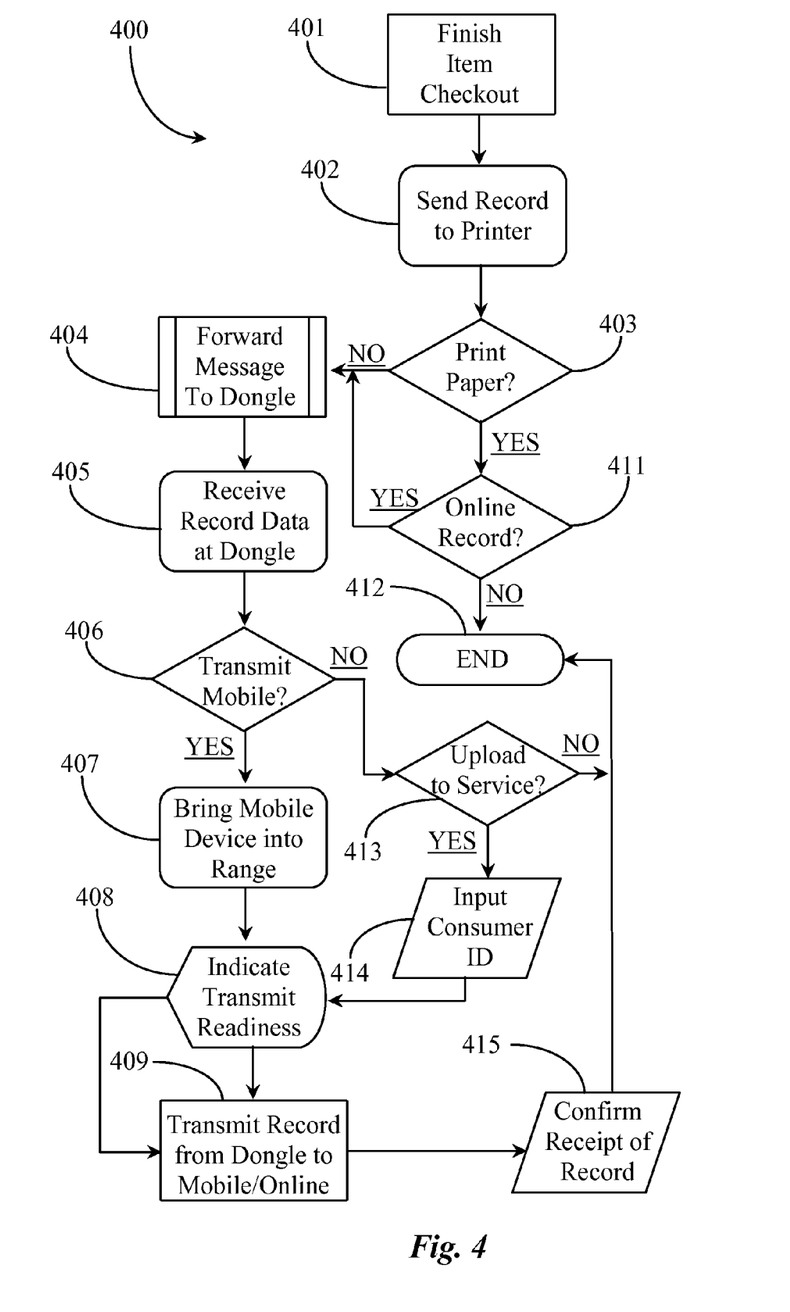
FIG. 4 is a process flow chart illustrating steps for transmittal of a transaction record from a POS computing appliance according to an aspect of the present invention.

FIG. 4 is a process flow chart 400 illustrating steps for transmittal of a transaction record from a POS computing appliance according to an aspect of the present invention. In this example, it is assumed that the consumer has installed the SW of the present invention on his or her personal mobile device. At step 401, the consumer finishes an item checkout transaction at a POS location and pays using a credit/debit card, a gift card, or some other form of payment. In one aspect, the process moves directly to step 402 where the human attendant or the POS computing appliance sends the record of the transaction to the printer. At step 403, the consumer might be prompted if they want a paper receipt. It is not a requirement to receive a paper receipt and it is environmentally friendly not to receive one. However, at step 403 the consumer is given the choice of paper or no paper.

At step 403, if the consumer decides they want a paper receipt, it is noted and the consumer is then prompted at step 411 to decide whether they want an online record. If they want paper but no online record or electronic receipt, then the process may simply end at step 412 with a printed receipt given to the consumer. In this case no information is sent to the dongle device. However, if at step 403 the consumer declines or opts out of receiving a paper receipt, then the process moves to step 404 and the printing message or command and data is forwarded to the dongle device. At step 411, if the consumer has accepted a paper receipt but still wants an electronic or online record, the consumer still has the option of receiving an electronic record. In this case the process moves to step 404 and the print message is sent to the dongle device emulating the physical printer. In one aspect of the process the print message is simultaneously sent to the physical printer and the emulated printer destination (dongle) at the same time.

At step 405 the print message including the transaction record data is sent to the dongle device. The transaction record data may include all of the usual particulars like merchant name, item list, item pricing, tax, total price, discount information, contact and website data, and so on. In one embodiment additional promotional data may be electronically transferred that would not necessarily be printed in a physical receipt. This might include an offer or notice of a discount shopping day, special pricing, survey data, or other promotional materials. In one embodiment a consumer may opt out of receiving any information in addition to the transaction record.

At step 406, the consumer may be prompted to make a decision whether to transmit the data to an available mobile device through wireless connection, or to have the data transmitted to a third-party site. If the consumer decides at step 406 not to transmit the data to a mobile device, then the consumer may be prompted to upload the electronic record to a designated service site for storage at step 413. If the consumer did not want to transmit the data to a mobile device at step 406, and did not want to upload the electronic record at step 413, then the process would terminate at step 412, perhaps with a paper receipt printed out by default.

If at step 406, the consumer elected to transmit the electronic record to a mobile device, then at step 407 the consumer brings the mobile device within wireless communication range of the dongle device to initiate transmission of the data from the dongle to the mobile device. In one aspect the transmission protocol is NFC or Bluetooth™. In one aspect, NFC is used to pair the dongle device and a Bluetooth™ enabled mobile device like a smart phone for communication using Bluetooth™ technology. At step 408 the dongle device may indicate when the record is ready to be offloaded from the device. It is noted herein that the offloading of the data does not erase the merchant copies of the transaction.

At step 409 the record data is transmitted from the dongle device to the mobile device. The process may then terminate at step 412 bypassing step 415 in the event that the record was not also transmitted to a third-party destination. If at step 406, the consumer determines not to transmit the record to the mobile device and the consumer determines at step 413 that they want to upload the data to a third-party service destination online, then at step 414 the consumer inputs consumer identification for validating the consumer with the third-party service destination. This may be accomplished by bringing an NFC or RFID tag having the consumer ID on it within wireless communication range of the dongle device. The dongle will acquire the data it needs from the tag to initiate transfer of the record over the Internet, for example, to the third-party service.

The process then moves to step 408 where the dongle device indicates that it is ready to transmit the data. Such indication may precede a confirmation step by the user to serve as a last approval for data transmission. For example, to affect the transfer, the user may have to press a button on the device or interact with an icon displayed on the touch screen. In one embodiment, the dongle device skips step 408 when the consumer has elected to have the record transmitted to an online storage. At step 409, the dongle device transmits the data to the third-party storage service, using the consumer ID to validate the process and to gain access to the repository server. At step 415 the dongle device may indicate a confirmation of completion of the task by a flashing icon, a LED, or some other visual or audio indication. A beep or series of tones may be used to indicate successful transmit of the data. The process then ends at step 412.

In one aspect of the process, it is possible that a consumer may want a mobile phone copy of the transaction record and may also want to upload a copy to a records management service. Steps 406 and 413 may be integrated to give the consumer a choice of receiving an electronic record locally and uploading the record to a service. In either case, the consumer need not give away email contact information or other personal information to the merchant or to the third party service. The PIN or PAC that the consumer has with the third-party service is sufficient to validate the consumer. It is also noted in this and in other aspects of the invention that encryption and other security regimens may be assumed present and in use.

Figure 5:
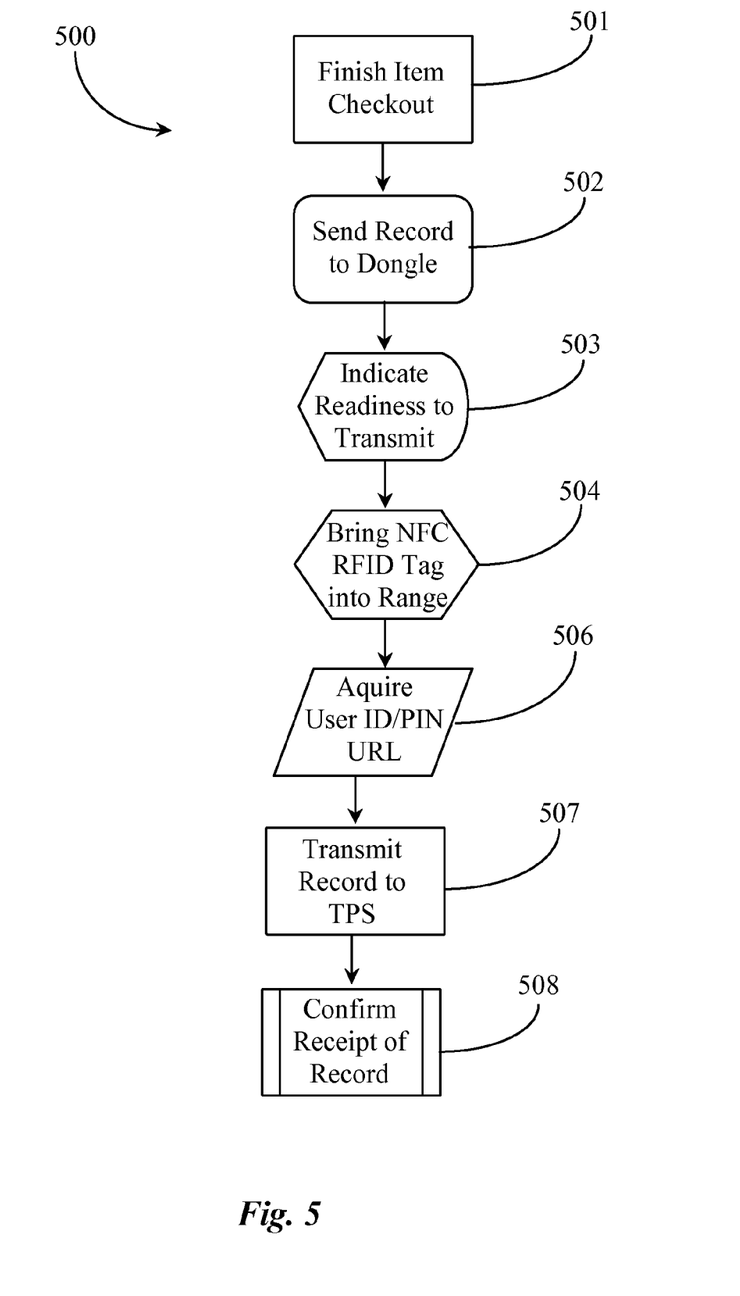
FIG. 5 is a process flow chart illustrating steps for transmittal of a transaction record from a POS computing appliance according to another aspect of the present invention.

FIG. 5 is a process flow chart 500 illustrating steps for transmittal of a transaction record from a POS computing appliance according to another aspect of the present invention. At step 501, a consumer finishes item checkout at a POS location. At step 502, the operator of the POS terminal or computing appliance sends the print command or message to the dongle device. This case assumes that the consumer does not have an NFC-capable smart phone or similar device, but that the consumer has an NFC tag or an RFID tag.

At step 503 the dongle device indicates a readiness to transmit the transaction record. Since the consumer has no local device for accepting the transaction record, at step 504 the consumer instead brings an NFC tag or an RFID tag into communication range with the dongle device. This process variation addresses the aspect of the consumer electing to save the transaction record to a third-party service. The consumer will have information on such tags that may be read by the dongle device aided by the SW of the present invention. The information will be required to validate the consumer and access the third-party service to which the consumer is a subscriber.

At step 506, the dongle device acquires the consumer ID, which may be a PIN, a PAC, or some other key that would enable access to the service on behalf of the consumer. At 507, the dongle device transmits the transaction record to the third-party service, which may represent a data records storage and management service.

Figure 6:
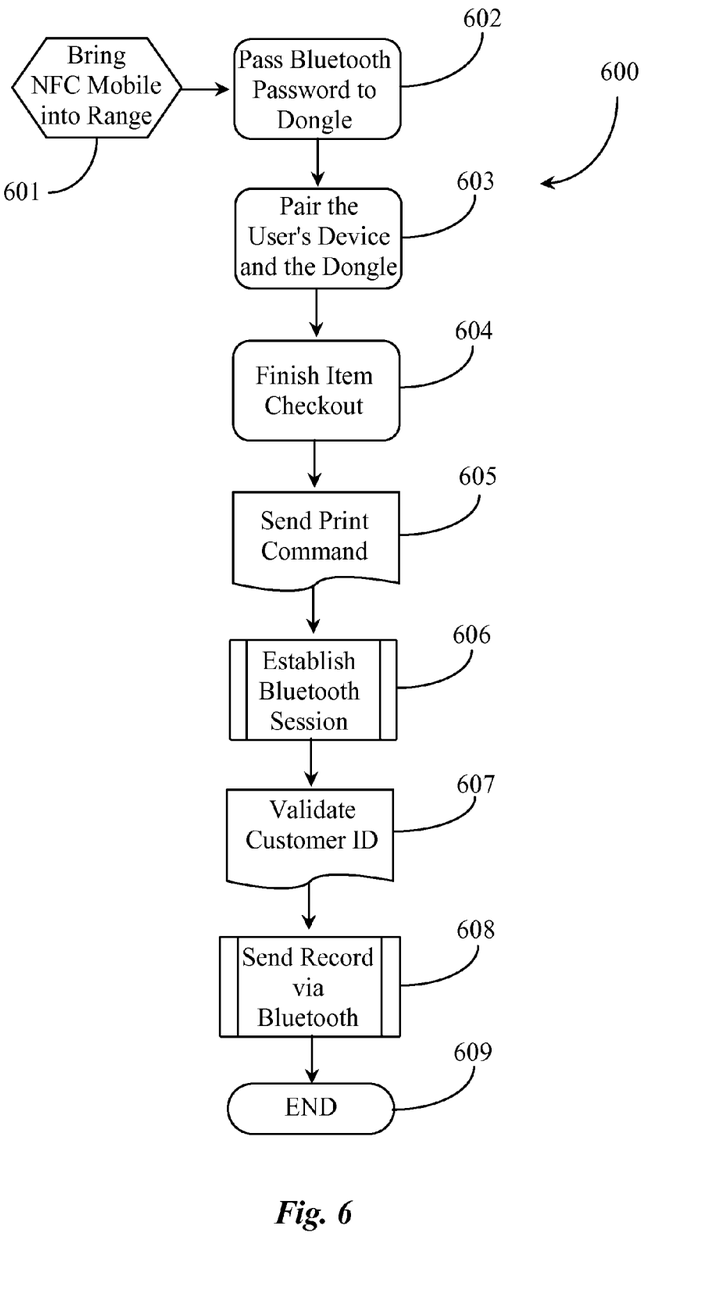
FIG. 6 is a process flow chart illustrating steps for transmittal of a transaction record from a POS computing appliance according to yet another aspect of the present invention.

FIG. 6 is a process flow chart 600 illustrating steps for transmittal of a transaction record from a POS computing appliance according to yet another aspect of the present invention. This aspect variation of the process assumes that the consumer has a mobile smart phone or similar device that is enabled for both NFC and Bluetooth™. At step 601, the consumer brings the NFC-enabled mobile device into dongle range for NFC. The object of this step is to initiate paring of the mobile device to the dongle device for Bluetooth™ communication. At step 602 the NFC mobile device transmits the Bluetooth™ pairing password for pairing the two devices for Bluetooth™ communication.

The consumer then may step back into Bluetooth™ range and the devices are successfully paired at step 603. Pairing of devices only has to be accomplished once per mobile device. The consumer may retain this paring if the consumer will repeat patronage of the same POS computing terminal in the conduct of future business. At step 604, the consumer finishes item checkout at the POS computing terminal. At step 605, the operator of the POS computing appliance sends a print command to the dongle device. The dongle device may indicate readiness to transmit the record at step 606 and establishes a Bluetooth™ session with the last mobile device that paired with the dongle.

At step 607 while the session is established, the dongle device receives and validates a consumer ID. This step is strictly for security purposes and to ensure that the correct receipt is transmitted to the correct mobile appliance. At step 608 the dongle device send the transaction record to the mobile device over the established Bluetooth™ session. The session is then terminated and the process ends at step 609. In one embodiment of the present invention, a mobile phone can be enabled for NFC by creating a hardware extension card that could be plugged into the smart telephone to give it NFC capabilities.

In one embodiment the system of the invention is applicable to the food services industry. For example, a restaurant payment process is different than a POS retail operation. In a restaurant, the receipt is generated before payment. Where tipping is practiced, the consumer specifies the amount of tip on the receipt and keeps a copy while returning a copy to the food server. The food server enters the tip amount to the POS computing appliance or directly to the credit card processor.

For a restaurant process, the most convenient implementation of the system is to have a hardware unit wirelessly in communication with the POS computing appliance. In this way, the food server may bring the device directly to the customer. It takes a single tap action by the consumer to submit payment information and pick up the digital receipt. If the consumer wants the tip information to be recorded with the receipt, the process can have available functions for taking a consumer input. In that case, a consumer may type in the tip amount into the "dongle". The SW on the device accepts the input and generates an updated record that contains the tip information.

In one embodiment, the NFC/Bluetooth™ process where the NFC is used to bridge communication. For example, when the food server brings the payment-receipt reader device (dongle) to the consumer, the consumer taps the device with mobile device while the receipt application is running. This action allows a Bluetooth™ connection to be established between the mobile device of the consumer and the receipt interface or dongle brought by the food server. The payment information and consumer ID if required is transmitted from the mobile device to the dongle device equivalent through NFC during the same tapping action or through Bluetooth™ after the tapping action has commenced to initiate Bluetooth™.

The food server also acquires the tip amount from the customer and inputs that into the dongle equivalent. The POS computing appliance sends the final receipt back to the dongle equivalent device with the tip information included and on to the consumer mobile device via Bluetooth™ connection.

In yet another embodiment of the invention receipt information may be transferred to a consumer at the POS without need for NFC, Bluetooth™, or other near-field communication technology. In one such embodiment the POS-side SW, having generated a receipt for a transaction, generates a unique ID for the receipt, and transmits the ID, receipt data and other information through Internet 102 to a third-party server, such as Server 127 in Online Management Service 105. At the same time SW 112 generates a unique bar code, QR code or other image-based code, the image-based code encoding receipt ID information and some other info to be immediately passed to the consumer (e.g. total amount, store ID, reward points earned, for example), and transmits that image-based code to the dongle 109, where it may be displayed on the display of the dongle. A dongle having the capabilities described above for NFC and/or Bluetooth™ communication. It is only necessary that the image-based code be displayed for the consumer.

In this embodiment it is not necessary that all of the information regarding the transaction be transmitted via the image-based code. The ID is critical for retrieval of further information that has been sent to the third-party service and associated to the ID.

The consumer, instead of having to have an NFC-enabled phone, uses the camera on their smart phone to scan the bar code, QR code, or other image-based code to collect the information stored in the code. Then the SW 113 executing on the consumer's mobile phone can decode the info, which, as described above, delivers some amount of immediate information related to the transaction to the shopper along with the unique ID. The consumer now can retrieve the full receipt information from the third-party server, using that unique receipt ID.

In one embodiment the entire body of information may be encoded in the image-based code, such as a QR code, or as much as the maximum capacity of the code may allow. As capacity capability increases, more data may be directly transmitted.

In yet another embodiment of the invention ultrasound communication technology may be used to transmit transaction information (receipt info) to the consumer at the POS, rather than NFC, Bluetooth™, or such as QR code. In this embodiment SW 112 and provides functionality for operating a speaker and microphone associated with computer 107 or a dongle such as 109, and SW 113 executing on the consumer's device operates the speaker and microphone on that device. Information is exchanged by ultra-sound encoding and decoding on each end. In one embodiment it is only necessary that the speaker apparatus on the POS side be used with the microphone on the consumer's device, to transmit information in one direction from the POS device to the consumer. The information thus transmitted may be just the unique code associated with a transaction, as described above, and perhaps a bit more information, wherein the full information has gone to a third party service associated with the unique code, and the consumer may then download as needed from the third-party service. This may be desirable, as ultrasound is rather slow at present compared to NFC and Bluetooth™.

The ultrasound technology may also be used to transmit unique shopper ID to the POS sale device which may then be paired with information uploaded to a third-party service, which may in turn push the complete info package to the consumer's mobile device, or to any other network-connected device preferred by the consumer.

In another variation the transaction record may be matched with the consumer ID so that the right information can be delivered to the right person by using the credit card info or loyalty card info or any token that uniquely represents the shopper, which the merchants are already capturing (e.g. from their payment terminal, face recognition, finger print scanning or other methods). In this embodiment, the consumer-side mobile application (software 113) just needs to require the shopper to pair such personal identifying information to their account with the e-receipt system.

In the embodiment described above, where an image-based code (QR for example) is used to transmit to the consumer a unique transaction ID, the POS side has no way of verifying that the consumer has, in fact scanned the code, until and unless the third-party server verifies to the POS that the consumer has, in fact, interacted with the server regarding that unique transaction ID. In one embodiment the QR code method may be coupled with the ultrasound method or NFC or RF communication, wherein the ultrasound method, NFC, or RF method may be used to send the shopper id to the POS side so that the POS side will immediately know that a consumer has scanned the encoding. Then the POS side may no longer display the code on its display. The secondary communication may also be based on certain electromagnetic signature and does not have to transmit the shopper ID back to the merchant side, rather simply identifies that another mobile device is nearby.

In some embodiments the receipt system in any one or a combination of embodiments described above may also be integrated with payment methods, loyalty systems, or with a customer relations management system.

It will be apparent to one with skill in the art that the transaction record distribution system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A point-of-sale (POS) receipt management system, comprising:
    an Internet-connected computerized POS appliance executing first software (SW) from a non transitory physical medium;
    a third-party server connected to the Internet;
    a portable communication device in possession of a consumer executing second SW; and
    a peripheral device coupled to the computerized POS appliance, the peripheral device having a display device enabled to communicate with the POS appliance;
    wherein, upon the consumer completing a transaction at the POS, the first software prepares transaction data including a unique transaction identification, and simultaneously sends the transaction data to the third-party server via the Internet and inserts at least a portion of the transaction data into an image-based code, which is transmitted to the peripheral device and displayed, and the portable communication device scans the displayed image-based code with an integrated camera and the second software decodes the image-based code thereby delivering a partial amount of the transaction data along with the unique identification required for retrieval of all of the transaction data from the third-party server.

2. The POS receipt management system of claim 1 wherein the image-based code which is displayed on the display of the peripheral device and captured by a camera of the consumer's mobile communication device, is a standard barcode.

3. The POS receipt management system of claim 2 wherein the image-based code is a QR code.

4. The POS receipt management system of claim 1 wherein communication from the consumer's portable communication device occurs by ultrasound technology enabled in both the POS and the consumer's portable communication device confirming successful scan of the image-based code by the consumer's portable communication device triggering removal of the image-based code from the display.

5. The POS receipt management system of claim 1 wherein the transaction data is pushed by the third-party server to an internet-connected appliance selected by the consumer when the consumer presents the unique identification to the third-party server.

6. A point-of-sale (POS) receipt management method, comprising the steps of:
    (a) composing transaction data at an Internet-connected point-of-sale (POS) computerized appliance regarding a completed transaction with a consumer;
    (b) inserting, by first software executing from a non-transitory physical medium, the transaction data along with a unique transaction identification into an image-based code;
    (c) simultaneously transmitting the image-based code to a display of a peripheral device coupled to the computerized appliance, and the transaction data and unique identification of step (a) to a third-party server;
    (d) scanning and decoding the image-based code on the display with a camera integrated into a portable communication device in possession of the consumer thereby delivering a partial amount of the transaction data along with the unique identification required for retrieval of all of the transaction data from the third-party server.

7. The POS receipt management method of claim 6 wherein in the image-based code which is displayed on a display of the peripheral device and captured by a camera of the consumer's mobile communication device is a standard barcode.

8. The POS receipt management method of claim 7 wherein the image based code is a QR code.

9. The POS receipt management method of claim 6 wherein an additional step provides communication from the consumer's portable communication device by ultrasound technology, enabled in both the POS and the consumer's portable communication device, confirming successful scan of the image-based code by the consumer's portable communication device triggering removal of the image-based code from the display.

10. The POS receipt management method of claim 6 wherein the transaction data is pushed by the third-party server to an internet-connected appliance selected by the consumer when the consumer presents the unique identification to the third-party server.

* * * * *